United States Patent
Sager et al.

(10) Patent No.: US 6,952,764 B2
(45) Date of Patent: Oct. 4, 2005

(54) STOPPING REPLAY TORNADOES

(75) Inventors: David J. Sager, Portland, OR (US);
Stephan Jourdan, Portland, OR (US);
Per Hammarlund, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 485 days.

(21) Appl. No.: 10/039,588

(22) Filed: Dec. 31, 2001

(65) Prior Publication Data

US 2003/0126405 A1 Jul. 3, 2003

(51) Int. Cl.$^7$ .................................................. G06F 9/30
(52) U.S. Cl. ........................................................ 712/218
(58) Field of Search .............................. 712/214, 216, 712/217, 218, 220, 245

(56) References Cited

U.S. PATENT DOCUMENTS

| | | | | |
|---|---|---|---|---|
| 5,012,403 A | * | 4/1991 | Keller et al. | 712/228 |
| 5,784,587 A | * | 7/1998 | Lotz et al. | 712/216 |
| 5,944,818 A | * | 8/1999 | Baxter et al. | 712/244 |
| 5,966,544 A | * | 10/1999 | Sager | 712/32 |
| 6,094,717 A | * | 7/2000 | Merchant et al. | 712/32 |
| 6,212,626 B1 | * | 4/2001 | Merchant et al. | 712/218 |
| 6,785,803 B1 | * | 8/2004 | Merchant et al. | 712/219 |

OTHER PUBLICATIONS

Heuring, Vincent P. and Jordan, Harry F. "Computer Systems Design and Architecture". Reading, Mass.: Addison Wesley Longman, Inc. ©1997. Inside Front cover diagrams of "The SRC Simple RISC Computer".*

* cited by examiner

*Primary Examiner*—Eddie Chan
*Assistant Examiner*—Aimee J. Li
(74) *Attorney, Agent, or Firm*—Ami Patel Shah

(57) ABSTRACT

A method for stopping replay tornadoes in a processor. The method of one embodiment comprises scheduling an instruction for execution speculatively. A determination is made whether the instruction executed correctly. The instruction is routed to a replay mechanism if the instruction did not execute correctly. A determination is made whether a replay tornado exists. The instruction is routed for re-execution if the instruction executed incorrectly and no replay tornado exists. Breaking the replay tornado if the replay tornado exists. Replay safe instructions in the pipeline are retired. Non-replay safe instructions in the pipeline are marked for re-execution. The non-replay safe instructions are rescheduled for re-execution.

17 Claims, 4 Drawing Sheets

STOPPING REPLAY TORNADOES

FIELD OF THE INVENTION

The present invention relates generally to the field of microprocessors and computer systems. More particularly, the present invention relates to a method and apparatus for stopping replay tornadoes in microprocessors.

BACKGROUND OF THE INVENTION

Microprocessors are the brains behind computers and many other types of machines. The demand for faster processors continually outstrip present technology. The demand pressures all aspects of processor architecture to become faster. New generations of processor are now operating at frequencies that make almost any time delay a significant design constraint. As technology evolves, engineers strive to improve upon the performance of processors through the application various techniques to the architecture. One characteristic of a processor architecture is whether it executes instructions sequentially or out of order. An out of order architecture executes instructions in an order different from that in which the code was originally presented to the processor. With an out of order processor, executions units with the processor that otherwise may be idle can be more efficiently utilized. The sequential nature of software code creates data dependencies. A data dependency exists where a later instruction manipulates an operand X and the data at operand X is a result of an earlier instruction. Thus the later instruction has a data dependency on the result of the earlier instruction.

Another characteristic of a processor architecture is whether instruction processing is pipelined. The processor fetches instructions from memory and sends them into one end of the pipeline in pipelined processing. The pipeline comprises several stages, each of which perform some function necessary to process the instruction before the instruction proceeds to the next stage. Each stage moves the instruction closer to completion. A pipeline enables the processor to process more than one instruction at a time, thus increasing the instruction processing rate. Dependent instructions can cause a delay in the pipeline because processors typically do not schedule a dependent instruction until the instruction on which the dependent instruction depends has produced the correct result. But some pipelines process instructions speculatively. Speculative execution is where instructions are fetched and executed before pertinent data dependencies are resolved. During speculative execution, the processor predicts how dependencies will be resolved and executes instructions based on the predictions. The processor then verifies that the execution and predictions were correct before retiring the instruction and the results. Speculative execution can also involve predicting what instructions are needed depending on whether a branch is taken. For example, if two instructions are to be alternatively executed depending on the value of some quantity, then the pipeline has to predict what that value will be or which instruction will be executed. The processor then predicts the next instruction to be executed and fetches the predicted instruction before the previous instruction is actually executed.

The verification step can be a challenge. At the end of the pipeline, the results are temporarily stored until all the dependencies have been resolved. The processor then checks for mispredictions or exceptions. If there are no execution problems, the instructions are retired and the results committed to the architectural state. But if problems exist, the processor has to perform a correction routine. Existing techniques for handling exceptions in pipeline processing can substantially reduce instruction throughput.

Some processors use a replay mechanism that reintroduces instructions for execution if they have not executed correctly.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
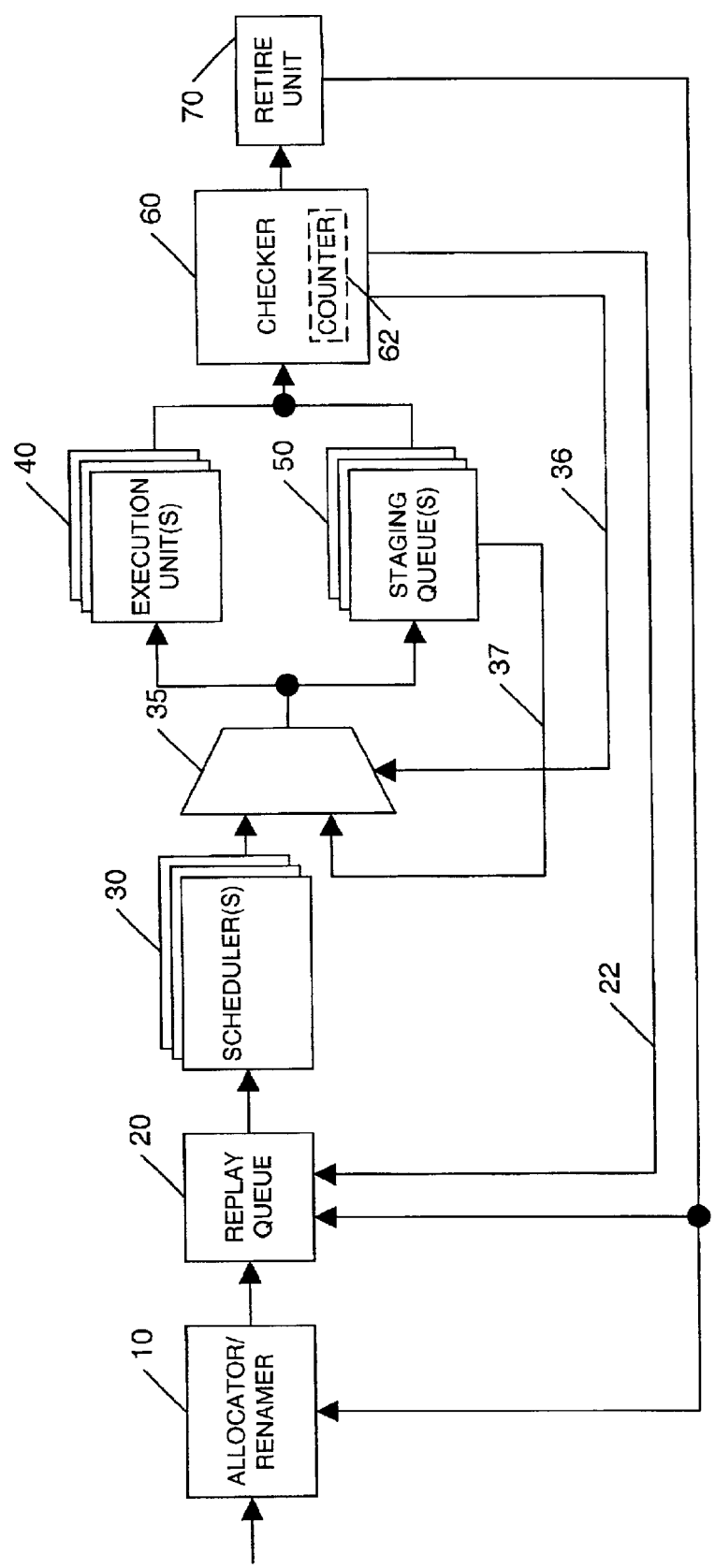
FIG. 1 is a block diagram of a portion of a processor according to an embodiment of the present invention.

A method and apparatus for a stopping replay tornadoes is disclosed. The embodiments described herein are described in the context of a microprocessor, but are not so limited. Although the following embodiments are described with reference to a processor, other embodiments are applicable to other integrated circuits or logic devices. The same techniques and teachings of the present invention can easily be applied to other types of circuits or semiconductor devices that can benefit from higher pipeline throughput and improved performance. The teachings of the present invention are applicable to any processor or machine that performs data speculation in executing instructions. However, the present invention is not limited to processors or machines that perform data speculation and can be applied to any processor and machine in which multiple levels of replay mechanism are needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

A processor pipeline includes various processing stages. Beginning with a fetch stage, instructions are retrieved and fed into the pipeline. The instructions retrieved at the fetch stage are then inputted into a decode stage where the instructions are decoded into micro-operations, also referred as micro-ops or uops, for execution by the processor. At an allocate stage, processor resources necessary for the execution of the micro-ops are allocated. The next stage in the pipeline is a rename stage where references to external registers are converted into internal register references to eliminate false dependencies caused by register reuse. At a schedule/dispatch stage, each micro-op is scheduled and dispatched to an execution unit. The micro-ops are then executed at an execute stage. After execution, the micro-ops are retired at a retire stage.

These processing stages can be organized into three phases. The first phase, referred to as an in-order front end phase, includes the fetch, decode, allocate, and rename stages. During the in order front end phase, the instructions proceed through the pipeline in their original program order. The second phase can be referred to as the out of order execution phase or back end phase including the schedule/dispatch stage and the execute stage. During this phase, each instruction may be scheduled, dispatched, and executed as soon as its data dependencies are resolved and the appropriate execution unit is available, regardless of its sequential position in the original program. The third phase, referred to as the in order retirement phase, includes the retire stage. In this phase, the instructions are retired in their original, sequential program order to preserve the integrity and semantics of the program.

The back end phase makes predictions that speculatively resolve dependencies needed to execute the micro-ops. After the execution, the micro-ops and results are temporarily stored to await commitment to architectural state. Committing to architectural state includes checking whether any problems occurred and whether the predictions were correct. If a problem or incorrect execution is discovered, the speculative execution results are squashed or ignored. The back end of the pipeline is then flushed or drained. The pipeline may also be reset.

An instruction can execute incorrectly for many reasons. The most common reasons are a source dependency on incorrect input or an external replay condition. A source dependency on incorrect input can occur when an instruction source is dependent on the result of another instruction. Data speculation may involve speculating that data from the execution of an instruction on which the present instruction is dependent will be stored in a location in cache memory. Data speculation can also involve speculating that data retrieved from a cache memory is valid. The processor proceeds on the assumption that data retrieved from memory is good. However, when the data is invalid, the results of the execution of the speculatively executed instructions are disregarded and the processor backs up to replay the instructions that were executed incorrectly. Problems can include: (1) a cache miss; (2) a branch or predicate misprediction; (3) an internal exception such as a page fault or an illegal instruction; (4) a translation look-aside buffer (TLB) miss; and (5) data dependencies such as load/store conflicts. The time to load from memory increases as each additional memory level is accessed.

Replay is the re-execution of instructions upon detecting that they were not correctly executed. If an exception is detected, speculative results are ignored. The architectural state is not updated and instructions are not retired. Execution problems can result in: (1) executing an instruction that should not have been executed; (2) not executing an instruction that should have been executed; or (3) executing an instruction with incorrect data. In order to process the instruction stream correctly, the effects of execution problems on subsequently executed instructions must also be corrected. The processor corrects the problem and replays the affected instructions.

If the data speculation is erroneous, the instruction is replayed by the execution unit until the correct result is obtained. For this embodiment, a checker is responsible for sending a copy of an instruction back to the execution unit for replay if an error is detected with respect to the execution of the instruction. It is desirable to limit the amount of replay because each replayed micro-op uses up available resources and degrades the overall system performance. But in general, replay provides a positive gain in net performance relative to alternative micro-architectural approaches. For speculative execution and replay on incorrect execution to be a beneficial technique, replay should not be required often. That is, speculation should usually be correct. The alternative solution would be to not speculatively execute instructions and simply wait the necessary amount of time for an instruction to complete correctly before issuing its dependent instructions. This alternative is not desirable as the processor will be waiting at every instruction when many of the instructions can be successfully speculatively executed.

A load instruction typically computes an address from source registers such as a base register and/or an index register. If the base register value and the index register value used by the load instruction are correct, then the instruction inputs are correct. If a load instruction's inputs are correct, then the load instruction was able to compute a correct linear address or virtual address. But other things may have gone wrong. For instance, it may have been impossible to translate this virtual address to a physical address because of a TLB miss. Or there may have been a cache miss in attempting to fetch the contents of the addressed physical location. Load instructions are replete with things that could go wrong.

If an instruction has correct inputs, but the result of the instruction is not correct, then that instruction is a primary replay cause. Primary replay causes are most typically load instructions, but there are a number of other instruction types that can possibly be primary replay causes. By contrast, a simple add instruction can never be a primary replay cause because if its inputs are correct, its result will always be correct. If an instruction has incorrect inputs and therefore its result is incorrect, this is called a secondary replaying instruction. A simple add instruction can frequently be a secondary replaying instruction, although, as previously mentioned, it can never be a primary replay cause.

First there is an instruction that is a primary replay cause. Typically, instructions that require the result of the primary replay cause as part of their input data execute soon after. These instructions were scheduled on the presumption (speculation) that the primary replay cause would get the correct result. However, the result was not correct. Hence, these subsequent instructions get incorrect input data and become secondary replaying instructions. Instructions that require the results of these secondary replaying instructions as part of their input data typically execute soon after and also become secondary replaying instructions. In principle, incorrect values can be passed from a parent to child this way forever. Hence it is possible that instructions can still require replay long after the primary replay cause that started the chain first occurred.

A "replay tornado" is defined to be a set of instructions requiring replay long after any primary cause. A primary replay cause is typically followed by a dozen or two of secondary replaying instructions in the chain that it causes. The chain is frequently terminated when results of the chain are not needed as inputs to more instructions until considerably later in time. The instructions with incorrect results get replayed and will have correct results before those results are needed. This ends the chain of replays. About every one or two hundred instructions, on average, a branch mispredicts. This also ends replay chains. A primary replay cause often starts a chain of replaying instructions of just a few instructions long to a few dozen instructions long, and the chain ends spontaneously. Occasionally, a single primary replay cause generates a chain that is more than fifty instructions long and may extend up to many thousands of instructions long, or more. This is a "replay tornado."

Overall performance in a processor can be improved by speculating that the result of executing instructions will be correct even if that is not true occasionally. The cost of such speculation may be simply the replaying of a chain of a few dozen instructions or so. However, if there is a replay tornado lasting for hundreds or a thousand instructions, then such an erroneous speculation is damaging to performance. The main damage caused by a tornado is the wasting of execution bandwidth to execute many instructions multiple times.

A replay tornado continues to exist only if it is fed. More instructions are put into execution on the speculation that preceding instructions will produce correct results. If that presumption is not realized, then these later instructions potentially grow the chain of replaying instructions. One way to stop a tornado is to stop putting more instructions into execution on the presumption that preceding instructions will produce correct results. If, one time, more instructions are not put into execution until previous instructions have actually produced correct results, then there can be no further instructions that require replay unless there is a new primary cause.

FIG. 1 is a block diagram of a portion of a processor including a tornado detection and replay mechanism in accordance with one embodiment of the present invention. Allocator/renamer 10 receives instructions from a front end of the pipeline. After allocating system resources for the instructions, the instructions are passed to rescheduler replay queue 20. Replay queue 20 stores instructions in program order. Instructions are then sent in program order to a scheduler 30.

As instructions enter the scheduler 30 from the replay queue 20, the scheduler 30 internally marks the destination registers of these instructions as "not ready". It is necessary to do this at some point because a destination register is reallocated to a new instruction after having been used as a destination by some previous instruction. Its state in the scheduler must be initialized to "not ready", since its prior owner probably left it marked ready. Other times could have been chosen to do this including, e.g. at register deallocation from the previous instruction or at register allocation to this instruction. But it is key to tornado breaking that it be done when the instruction is moved from the replay queue 20 to the scheduler 30. Observe also, as was mentioned previously, that instructions are moved from replay queue 20 to schedulers 30 in program order. When the scheduler 30 dispatches an instruction to the execution units 40 and the staging queues 50, the destination register for that instruction is internally marked "ready". Hence, the scheduler 30 knows that other instructions that require this register as an input no longer have to wait for this register. These instructions wait until the condition where input data is projected to be ready at the time when these instructions would arrive at execution before dispatching to execution.

Scheduler 30 is coupled to send instructions to execution units 40 and staging queues 50. Scheduler 30 may re-order the instructions to execute the instructions out of program order to achieve efficiencies inherent with data speculation. In determining the order in which instructions will be sent to be executed, scheduler 30 uses the data dependencies of instructions and the latencies of instructions in determining the order of execution of instructions. Based on a combination of the data dependencies of various instructions and the anticipated execution time of instructions, the scheduler 30 determines the order of execution of instructions. The execution units 40 execute instructions and pass notification of things that have gone wrong, e.g. cache miss, to a checker 60. Staging queue 50 is used to send instruction information in parallel with execution unit 40 to the checker 60. Staging queue 50 also supplies 37 the instruction to the replay multiplexor 35, which can put the instruction back into execution if so ordered by the checker 60.

The checker 60 identifies primary replay cause instructions from notification from the execution units 40. The checker then determines secondary replaying instructions by tracking the propagation of erroneous results from instruction to instruction. The checker 60 will pass correctly executed instructions to retire unit 70. The checker 60 can direct the replay multiplexor 35 to place an instruction that has not produced correct results back into execution immediately. When this is done, the scheduler 30 is prevented from dispatching an instruction that would collide with a replaying instruction in the replay multiplexor 35. The checker 60 also has the option of simply letting an instruction that has not produced correct results disappear; that is, the instruction does not go to the retire unit 70 or back into execution via the multiplexor 35. In any case, the checker 60 needs to report 22 to the replay queue 20 that the instruction is replay safe or not. The instruction is replay safe if the checker 60 has determined that it produced the correct result and has passed it to the retire unit 70. Retirement unit 70 is coupled to checker 60 and retires the instructions in program order and applies the results to the architectural state if no errors exist. Upon retirement, certain resources are to be reclaimed from the instruction. The retire unit 70 informs the allocator/renamer 10 of the retirement so that they may reclaim appropriate resources. Depending on the embodiment, it may be necessary for the replay queue 20 to also be informed of the retirement of an instruction.

The replay queue 20 holds all instructions that have passed the allocator 10 and are not yet retired. Replay queue 20 has a means for identifying several different subsets of the instructions it contains. In one implementation, this takes the form of several different bit vectors, wherein each bit vector has one bit corresponding to each instruction in replay queue 20. A subset of the instructions is represented in a bit vector that exists to represent this subset, wherein "1" bits are for instructions in the subset and "0" bits for instructions not in the subset. Replay queue 20 has identified subsets for instructions eligible to schedule and instructions that are not replay safe, among possibly other subsets. Replay safe instructions are those instructions that have passed the checker 60 and cannot be brought back.

When an instruction enters the replay queue 20 from the allocator/renamer 10, the instruction is made "eligible to schedule" and "not replay safe". When an instruction is placed in the schedulers 30 from the replay queue 20, the instruction is made "not eligible to schedule". When an instruction is declared "replay safe" by the checker 60, the instruction is passed to the retire unit 70 and a message is sent to the replay queue 20. Upon receipt of this message from the checker 60, the replay queue 20 puts the instruction into the "replay safe" subset. During normal operation, replay queue 20 selects instructions that are "eligible to schedule" in program order to send to the scheduler 30 as long as the scheduler 30 is not full and the replay queue 20 has at least one instruction that is "eligible to schedule".

A replay tornado may be stopped, at some instant, by replay queue 20 making all instructions that are not replay safe become eligible to schedule. When this is done, all of the instructions which have previously gone to the schedulers 30 from the replay queue 20, but which have not yet been shown to be correctly executed, have been made eligible to schedule again. But more importantly, these instructions are all ahead of the instructions which have never gone to the schedulers 30 before. The schedulers 30 will, in usual fashion, mark the destinations of all of these instructions "not ready", before the new instructions which have not yet gone to the schedulers 30 can go to the schedulers 30. The schedulers 30 will then not presume that instructions that have gone to the schedulers 30 before produced correct results before, when determining when new instructions should be dispatched to execute. If the replay queue 20 had not made all instructions that are not replay safe eligible to schedule, then the scheduler would continue to presume that all previous instructions produced correct results before when scheduling new instructions that arrive from the replay queue 20. If a tornado was in progress, this would have continued to feed that tornado. The instructions will execute correctly if there is no new primary cause.

When replay queue 20 makes all instructions that are not replay safe eligible to schedule, the net effect to instruction scheduling is that all memory that some of these instructions have been in the scheduler before or have executed before are gone. All instructions that are not replay safe are assumed by the scheduler to have never produced correct results before. All must now be sent to execution and the scheduler 30 will speculate only on the results of this new execution.

There are certain problems with this that must be addressed. If instructions are still in the scheduler 30 waiting to dispatch when all instructions that are not replay safe are made eligible to schedule, these could get stuck if it is possible for an instruction to have its destination register marked "not ready" but not get to a position in which it could dispatch to execution. It is probably a good policy to clear the scheduler 30 when all instruction that are not replay safe are made eligible to schedule.

When all instructions that are not replay safe are made eligible to schedule, this will, in general, lead to multiple instances of the same instruction in execution. One approach is to have a machine design that will tolerate this. The primary requirement is to know how many instances of each instruction exist and not retire an instruction until all instances have completed. Another approach is to remove all instances of instructions that are in the schedulers 30 or further down the pipe, but not retired when all instructions that are not replay safe are made eligible to schedule. Then the new instances of instructions introduced into the schedulers 30 from the replay queue 20 will be the only instances in execution. Instances of instructions can be quickly removed by tagging them with the current "Live Instance Number" when moving them from the replay queue 20 to the schedulers 30. These instances are all removed by changing the current Live Instance Number, leaving all instances with a different number to be effectively annihilated. Various units, such as the checker 60 and the retire unit 70 need to know what the current Live Instance Number is so they can determine when instances of instructions pass, whether the instances are live or dead.

When the checker 60 has determined that an instruction has not executed correctly, there are two distinct ways in which the instruction can be executed again (replayed) to try again to get the instruction correctly executed. The first method is called a "fast replay". In the first method all information necessary to execute the instruction again is available from the staging queue 50. The checker 60 can switch the multiplexor 35 to reinsert 36 this information immediately back to execution. The scheduler 30 has to be prevented from dispatching a new instruction to execution that would collide with the instruction being replayed. A second method is called a "replay from the replay queue". In the second method, no action is taken immediately. Because the instruction was not declared "replay safe" by the checker 60, the instruction is still "not replay safe" in the replay queue 20. The instruction simply disappears from the execution pipe since the checker 60 has not passed it to retirement and has not reinserted it for immediate re-execution as in the first method. At some later time, all instructions in the replay queue 20 that axe not "replay safe" will be made "eligible to schedule". This will cause this instruction, when its turn comes in program order, to be sent again to the scheduler 30 and from there to execution. The first method has the advantage that an instruction can be executed again immediately upon discovering that its last execution did not produce a correct result. Usually it can be highly beneficial to performance to re-execute an instruction that was not executed correctly very quickly, specifically at the time that correct data could be available as a result of access to a higher level cache. This is because a cache miss is the most common event to cause incorrect results. The first method, however, provides little flexibility. The second method takes much longer to return an instruction that was not executed correctly to try executing it again. The advantage is that the second method provides a high level of control on how that is done. Replaying from the replay queue, the second method, as has been mentioned before, will not produce a tornado and will, in fact, stop any tornadoes that may have otherwise started.

The first method, fast replay, is normally used because this usually works well and has performance advantages when it works well. When a sequence of instructions are fast replayed, the scheduler 30 is prevented from issuing new instructions to execution only when they would directly collide with replaying instructions. Typically, the sequence of fast replaying instructions is not dense. Hence new instructions issued from the scheduler 30 will typically be interleaved with replaying instructions. In this case, a sequence of replaying instructions is likely to be "fed" with more instructions from the scheduler, potentially extending the replay sequence. Usually it is good for performance for the scheduler to keep issuing new instructions into execution because usually the replay sequence ends in a dozen instructions or so and this method gets these new instructions into execution sooner than would be the case if the scheduler did not continue issuing instructions. Beyond this, stopping all scheduling of new instructions when some instructions are replaying can lead to deadlock because the replaying instructions may be unable to get correct inputs unless an instruction still in the scheduler is dispatched and executed. Hence, although it would prevent tornadoes to completely stop the scheduler until all replays are done that is not recommended because it will create deadlocks and it is disadvantageous to performance. However, doing a fast replay, with replaying instructions interleaved with newly scheduled instructions risks forming a replay tornado, and from time to time a tornado does indeed develop.

If it is determined that a primary cause for a replay will not be correctly executed for a long time, then the checker may elect to not fast replay this instruction, and therefore not fast replay the instructions dependent on this primary cause either. For example, it may be known that the primary cause is a load and that the load operation has missed in all on-chip caches so that the data that this instruction needs will have to be retrieved from off-chip memory. This probably would become known only after this load has fast replayed one or more times. By not continuing to fast replay this load instruction and the subsequent instructions that depend on it when there is no hope of correctly executing any of these instructions, power can be saved and resources can be saved to do other instructions. In this case, it is necessary that a signal be produced when the required data becomes available. For this example, data was required from the off-chip main memory. A signal is produced when that data is finally forthcoming. This signal is used to start a "replay from the replay queue". That is, in response to this signal, all instructions in the replay queue that are not replay safe are made eligible to schedule. As a consequence, all of these instructions will make their way to the scheduler and from there to the execution unit to be executed again. This replay is entirely tornado free.

For one embodiment, a replay tornado table is maintained by the checker. This table is used to predict the possible occurrence of a replay tornado. The table tracks the memory loads that have caused replay tornadoes in the past. In one embodiment, the table has a structure similar to that of a branch prediction table. The replay tornado table may maintain a history of load instructions or a set of addresses of load instructions that have caused problems. The replay tornado table can be extended to detect other problematic instructions as well. If an instruction is predicted to be likely to start a tornado from past behavior and the checker finds that this instruction did not execute correctly, the checker would elect to start a replay from the replay queue instead of fast replaying this instruction. The checker would immediately signal the replay queue to make all instructions that are not replay safe eligible to schedule. The checker would further not do any fast replays until a new primary cause is found. This replay as with other replays from the replay queue is entirely tornado free. The apparently likely tornado is avoided at the cost of taking much longer to get this instruction tried again. The checker will fast replay primary cause instructions that are not predicted to start tornadoes and, of course, all the secondary replaying instructions following until again an instruction that is predicted to start tornadoes does not execute correctly.

The processor of one embodiment is capable of replay tornado detection. The mechanism of one embodiment tracks the time that has elapsed since a primary cause for an incorrectly executed instruction. One example of a primary cause is a cache miss in response to a memory load operation. Due to the cache miss, the checker will indicate that the instruction was not executed successfully. The mechanism measures passage of time from the point this replay causing "primary cause" event occurred. This may be measured with a counter 62 in the checker system. The counter 62 is cleared when a primary cause is replayed. Otherwise the counter increments each cycle. If there is a secondary replaying instruction and the counter value is over a limit, a tornado is declared. The rate of replaying may be monitored with a counter 62 that increments when there is secondary replaying instruction and is periodically shifted right to effectively divide its value by 2. It may be desirable to declare a tornado only if the replay rate is over a limit when said time counter is over a limit. This is true because a very low rate of replays does little damage so that stopping the tornado may not be worth the cost if the replay rate is only small.

If a tornado is detected then it is broken by causing the replay queue 20 to make all instructions that are not replay safe eligible to schedule. As was noted, this is a tornado free replay that also stops any tornadoes that were otherwise going on. There is a cost to this. Some instructions that were in the execution pipe would complete correctly but are not yet replay safe. These instructions will be done over again anyway. Besides this, it will be a significant time before they are done over since it takes significant time for these instruction to come down the pipe from the replay queue 20. This is a preferable way to stop a tornado, but for performance reasons it is undesirable to use it indiscriminately.

Figure 2:
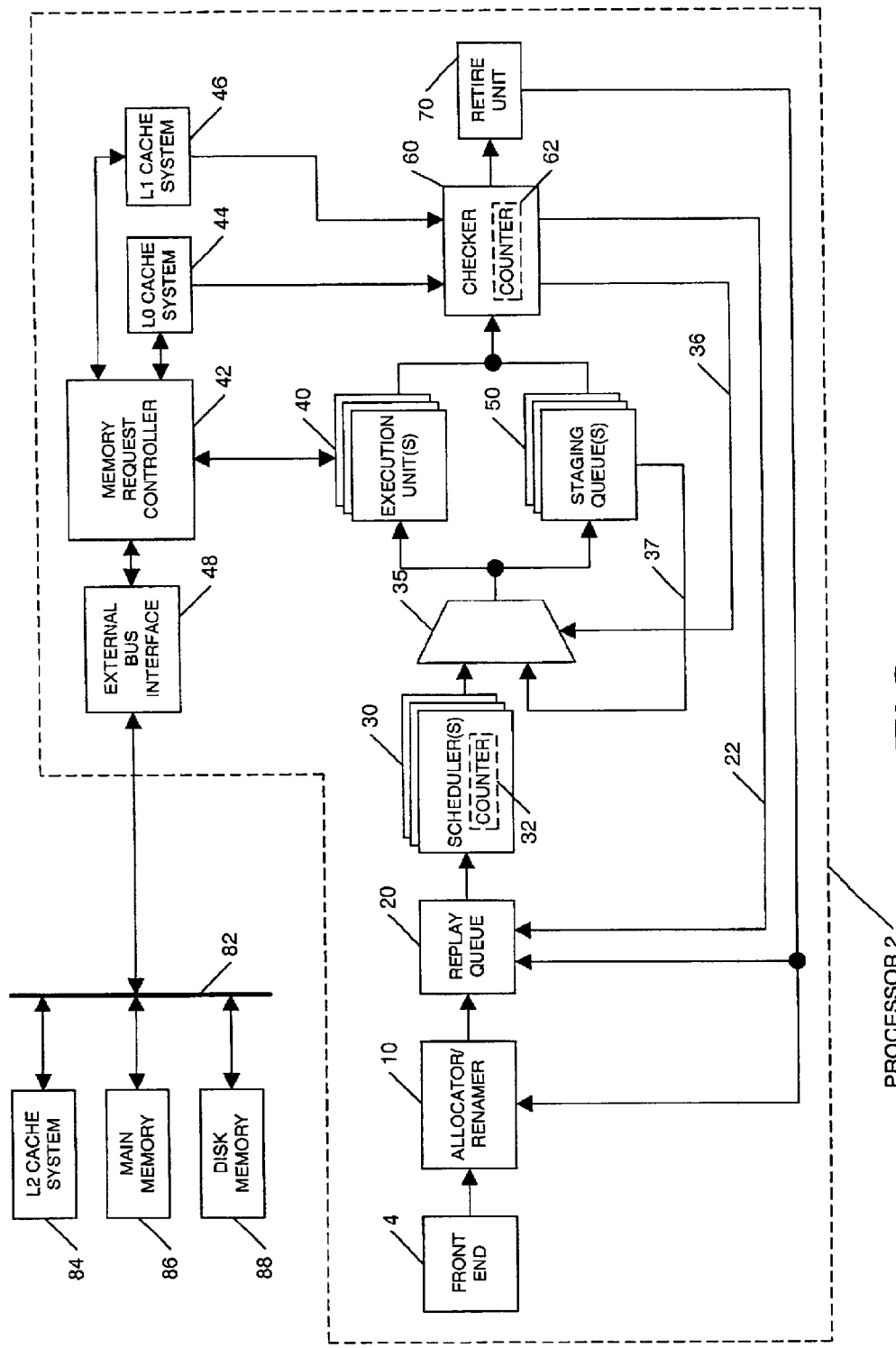
FIG. 2 is a block diagram of a processor that includes an embodiment of the present invention.

FIG. 2 is a block diagram of a processor 2 that includes an embodiment of a tornado detection and replay mechanism 20 in accordance the present invention. The front end 4 of the processing phase is coupled to the scheduler 30 via allocator/renamer 10 and a rescheduler replay queue 20. Instructions are dispatched speculatively from the scheduler 30. Thus the scheduler 30 can dispatch an instruction without first determining whether data needed by the instruction is valid or available. Scheduler 30 dispatches instructions from the front end when the input data needed to execute the instructions is projected to be ready when the instruction would reach execution. The scheduler includes a counter 32.

Processor 2 further includes a replay mechanism implemented via checker 60, staging queue 50, and replay multiplexor 35. In addition replays can be done from the replay queue 20 when the checker 60 elects to do so. The replay system replays instructions that were not executed correctly after they were scheduled by the scheduler 30 The execution unit 40 performs data speculation in executing an instruction. Execution unit 40 can be an arithmetic logic unit (ALU), a floating point ALU, a memory unit, etc. Although the example of FIG. 2 shows one execution unit 40 and one staging queue 50 in order to simply the description, multiple execution units 40 and staging queues 50 can be coupled to multiple schedulers. Execution unit 40 may be coupled to multiple levels of memory devices from which data may be retrieved and to which data may be stored. In one embodiment, execution unit 40 is coupled to L0 cache system 44, and L1 cache system 46, and external memory devices 84, 86, 88, via memory request controller 42.

If data requested by execution unit 40 is not found in L0 cache system 44, execution unit 40 may attempt to retrieve needed data from additional levels of memory devices. Such requests may be made through memory request controller 42. After L0 cache system 44 is checked, the next level of memory devices is L1 cache system 46. If the data needed is not found in L1 cache system 46, execution unit 40 may be forced to retrieve the needed data from the next level of memory devices, such as external memory devices coupled to processor 2 via external bus 82. An external bus interface 48 is coupled to memory request controller 42 and external bus 82. In one embodiment, external memory devices may includes L2 cache system 84, main memory 86, disk memory 88, and other storage devices which may be coupled to external bus 82. Disk memory 88, main memory 86, and L2 cache system 84 are considered external memory devices because they are external to the processor 2 and are coupled to the processor 2 via an external bus 82. Access to main memory 86 and disk memory 88 are substantially slower than access to L2 cache system 84. Access to all external memory devices is much slower than access to the on-die cache memory. The processor itself will access the L2 cache system and the main memory as needed. Access to disk memory 88 may be under the control of software.

When attempting to load data to a register from memory, execution unit 40 attempts to load the data from each of the memory devices from fastest to slowest. In one embodiment, the fastest level of memory devices, L0 cache system 44, is checked first, followed by L1 cache system 46, L2 cache system 84, main memory 86. and disk memory 88 may be accessed by software. The time to load memory increases as each additional memory level is accessed. When the needed data is eventually found, the data retrieved by execution unit 40 is stored in the fastest available memory device for future access.

In this embodiment, staging queue 50 may delay instructions for a fixed number of clock cycles so that the report on problems in executing the instruction in the execution unit 40 and the instruction may enter the checker 60 at the same moment in time. In various embodiments, the number of stages in staging queue 50 varies based on the amount of staging or delay desired in each execution channel. A copy of each dispatched instruction may be staged through staging queue 50 in parallel to being executed through execution unit 40. In this manner, a copy of the instruction maintained in staging queues 50 is provided to checker 60. This copy of the instruction can be routed back to replay multiplexor 35 by checker 60 for re-execution if the instruction did not execute successfully.

In this replay architecture, a checker unit 60 is positioned after the execution core 40. The checker 60 can analyze the data dependency of the instruction and whether any error exists. Furthermore, the checker 60 also checks the condition of the result of the execution to determine whether replay is necessary. If an instruction has executed successfully, the checker 60 marks the instruction as completed and declares the instruction "replay safe". "Replay safe" instructions are forwarded to retire unit 70. For another embodiment, multiple checkers (a fast or early checker and a slow or late checker) can be used, and permit the detection of incorrect instruction execution at different points in the pipeline. One reason for having both fast checker and slow checker is because the primary replay conditions generated by execution unit 40 are generated at different stages in the pipeline. For instance, there are cases in which certain errors and conditions can be detected earlier which indicates that data speculation in these cases is erroneous even before the TLB logic and the hit/miss logic are executed. The respective instructions that were executed incorrectly due to erroneous data speculation could be sent back to the execution core for re-execution or replay sooner. Similarly, another embodiment can have multiple replay paths.

Other conditions can also generate replays. For example, if two different instructions need the same hardware resource at that same time, one of the instructions may need to be replayed as both instructions cannot access the resource simultaneously. One advantage of this arrangement is that the fast checker is able to replay some instructions as quickly as possible based on earlier generated replay conditions. The performance of the processor 2 improves because instructions are replayed more quickly. The checker 60 is coupled to the retirement unit 70.

The scheduler 30 and the execution unit 40 assume that everything is okay. The checker 60 and retirement unit 70 check for problems. Three basic conditions are generally checked. One condition checked is data dependency. This check ensures that all input data dependencies were met at execution. A second condition checked involves replay requests. This check determines whether the execution unit 40 or memory request controller 42 have requested that an instruction be replayed. A third condition involves bogus instructions. A check is made for speculative instructions that follow the detection of a mispredicted branch and have been passed on for retirement.

Figure 3:
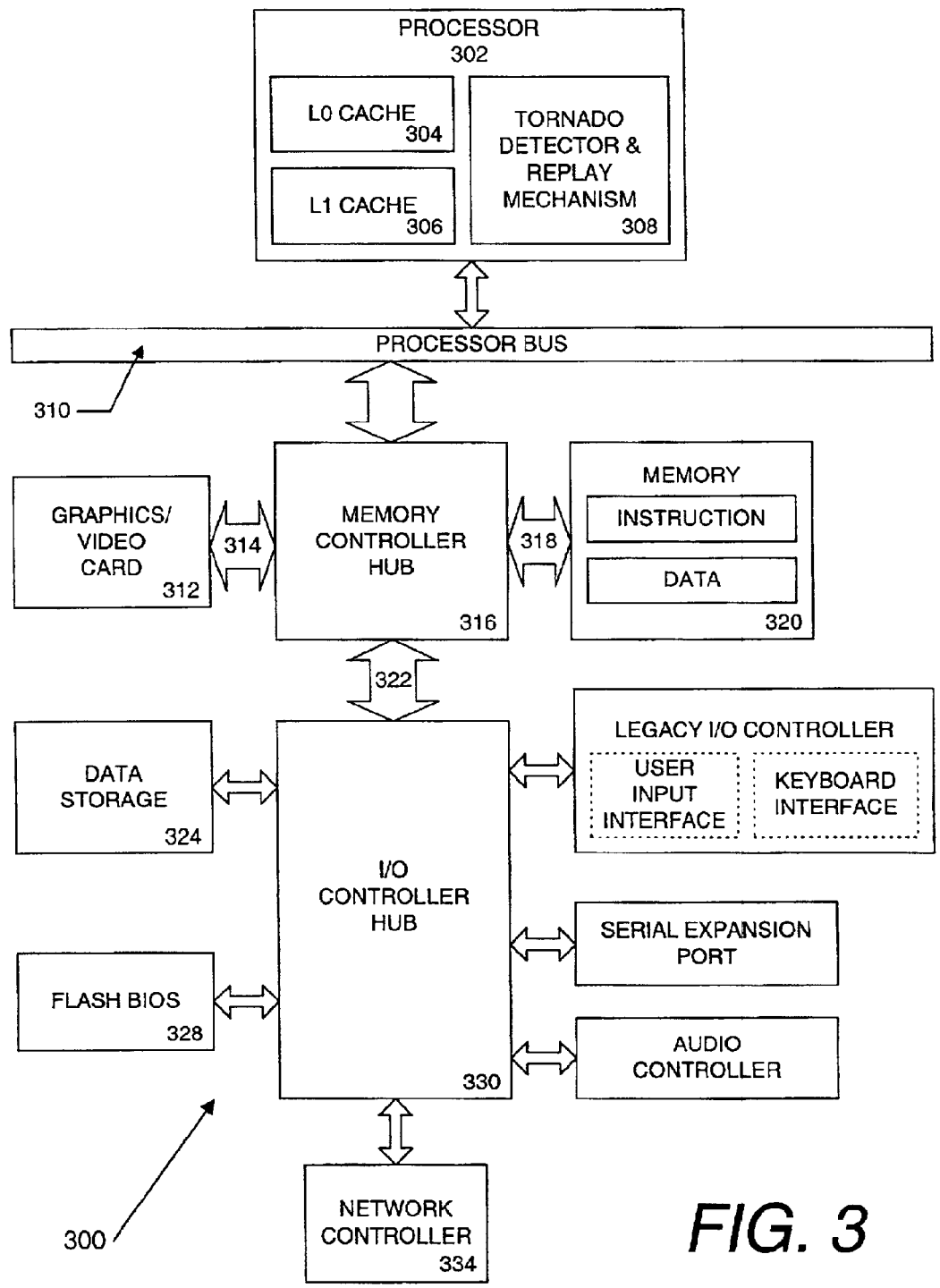
FIG. 3 is a block diagram of a computer system formed with a processor that includes a mechanism for stopping replay tornadoes in accordance with one embodiment of the present invention.

Referring now to FIG. 3, an exemplary computer system 300 is shown. System 300 includes a component, such as a processor 302, employing a tornado detector and replay mechanism 308 in accordance with the present invention, such as in the embodiment described herein. The processor 302 of this embodiment speculatively schedules instructions and that includes a replay system 308. The replay system 308 replays instructions that were not executed correctly when they were initially dispatched to an execution unit while preserving the originally scheduled order of the instructions. An instruction is considered not successfully executed when the instruction is executed with bad data, or an instruction whose output are bad due to a cache miss, etc.

System 300 is representative of processing systems based on the PENTIUM® III, PENTIUM® 4, Itanium™ microprocessors available from Intel Corporation of Santa Clara, Calif., although other systems (including PCs having other microprocessors, engineering workstations, set-top boxes and the like) may also be used. In one embodiment, system 300 may be executing a version of the WINDOWS™ operating system available from Microsoft Corporation of Redmond, Wash., although other operating systems and graphical user interfaces may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system which use a mechanism for minimizing power dissipation for other embodiments.

FIG. 3 is a block diagram of a computer system 300 formed with a processor 302 that includes a tornado detection and replay system 308 in accordance with the present invention. The present embodiment is described in the context of a single processor desktop or server system, but alternative embodiments can include a multiprocessor system. System 300 is an example of a hub architecture. The computer system 300 includes a processor 302 that processes data signals. The processor 302 can be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 3 shows an embodiment of the present invention implemented in a single processor system 300. However, it is understood that other embodiments may alternatively be implemented in multiprocessor systems. The processor 302 is coupled to a processor bus 310 that transmits data signals between the processor 302 and other components in the system 300. The elements of system 300 perform their conventional functions well known in the art.

In one embodiment, the processor 302 includes a Level 0 (L0) internal cache memory 304 and a Level 1 (L1) internal cache memory 306. Depending on the architecture, the processor 302 can have a single internal cache or multiple levels of internal cache. Alternatively, in another embodiment, the cache memory can reside external to the processor 302. A tornado detector and replay mechanism 308 also resides in the processor 302. Alternate embodiments of a tornado detector and replay mechanism 308 can also be used in micro controllers, embedded processors, graphics devices, DSPs, and other types of logic circuits. System 300 includes a memory 320. Memory 320 can be a dynamic random access memory (DRAM) device, a static random access memory (SRAM) device, flash memory, or other memory device. Memory 320 can store instructions and data that can be executed by the processor 302.

A system logic chip 316 is coupled to the processor bus 310 and memory 320. The system logic chip 316 in the illustrated embodiment is a memory controller hub (MCH). The processor 302 communicates to the MCH 316 via a processor bus 310. The MCH 316 provides a high bandwidth memory path 318 to memory 320 for instruction and data storage and for storage of graphics commands, data and textures. The MCH 316 directs data signals between the processor 302, memory 320, and other components in the system 300 and bridges the data signals between processor bus 310, memory 320, and system I/O 322. In some embodiments, the system logic chip 316 provides a graphics port for coupling to a graphics controller 312. The MCH 316 is coupled to memory 320 through a memory interface 318. The graphics card 312 is coupled to the MCH 316 through an Accelerated Graphics Port (AGP) interconnect 314.

System 300 uses a proprietary hub interface bus 322 to couple the MCH 316 to the I/O controller hub (ICH) 330. The ICH 330 provides direct connections to some I/O devices. Some examples are the audio controller, firmware hub (flash BIOS) 328, data storage 324, legacy I/O controller containing user input and keyboard interfaces, a serial expansion port such as Universal Serial Bus (USB), and a network controller 334. The data storage device 324 can comprise a hard disk drive, a floppy disk drive, a CD-ROM device, a flash memory device, or other mass storage device.

For another embodiment of a system, a replay mechanism can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 4:
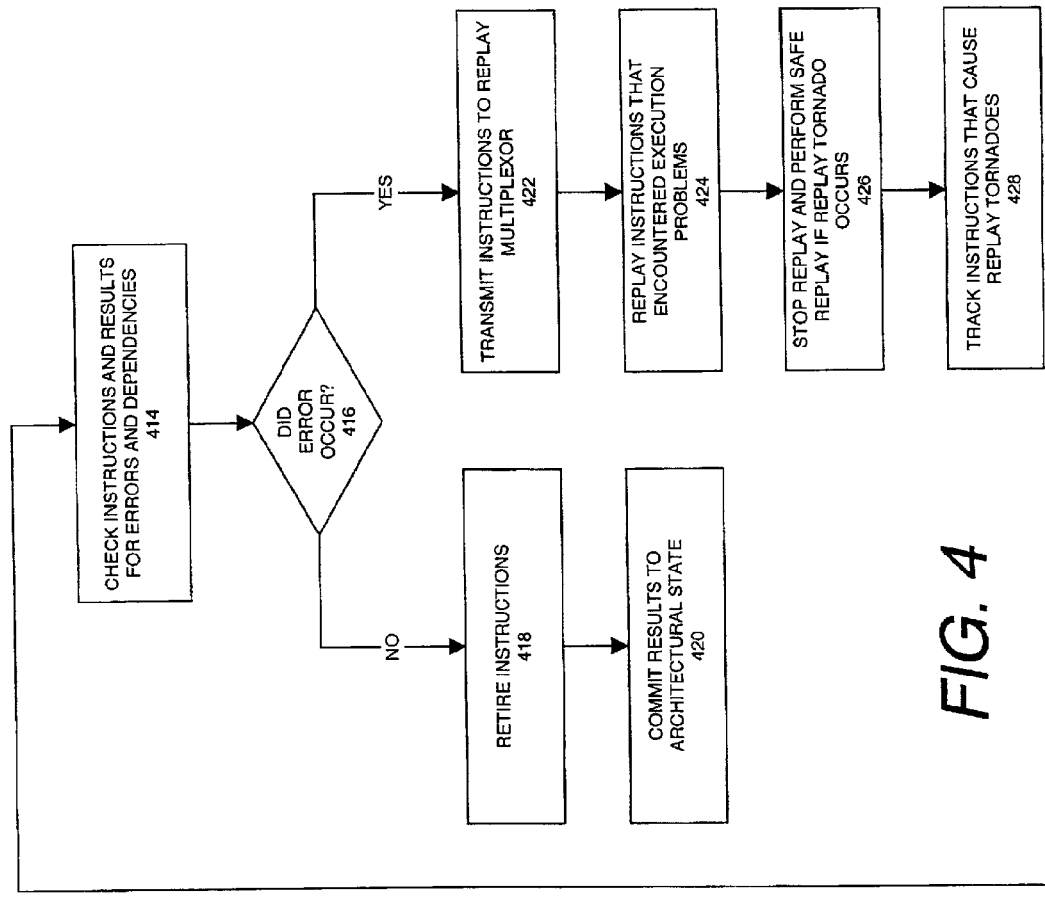
FIG. 4 is a flow chart showing one embodiment of a method of processing instructions in accordance with the present invention.
Figure 4:
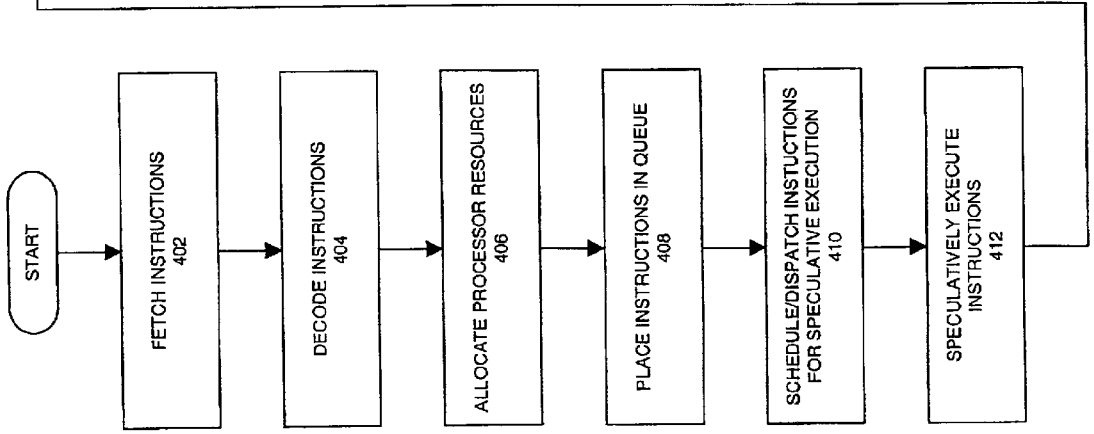

FIG. 4 is a flow chart showing one embodiment of a method of processing instructions in accordance with the present invention. At block 402, the processor pipeline fetches instructions from memory. The instructions are decoded at block 404. The processor then allocates the necessary processor resources at block 406 for each decoded instruction. The instructions are placed in a scheduler queue at block 408 for scheduling. Each instruction that is ready for execution is scheduled or dispatched for speculative execution at block 410. At block 412, each instruction is speculatively executed. After the instructions are executed, the instructions and results are checked for errors and dependency issues at block 414. At block 416, a determination is made as to whether an error occurred. If no error exists and the instruction executed correctly, the instruction is retired at block 418. The results of that instruction are committed to the architectural state at block 420. But if an error exists, then the instruction is transmitted to the replay multiplexor at block 422. The instructions that encountered execution problems are replayed at block 424. A tornado detection mechanism monitors the replay for the presence of a tornado. If a tornado is detected, the replay is stopped and the tornado broken at block 426. A tornado safe replay is initiated for the stopped instructions. A replay from the replay queue is an example of a tornado safe replay. The tornado detection mechanism records and tracks the instructions that cause replay tornadoes 428. A table of these troublesome instructions can be used by a tornado prediction mechanism to avoid future tornadoes.

The examples above have been described in the context of a single processor. In a multiprocessor system, the method can be performed concurrently in each processor. Although a replay system having one checker is disclosed, the replay system of other embodiments can have more than one checkers. Each successive checker may detect a larger set of replay conditions, ensuring that an incorrectly executed operation will be detected and replayed. The processors described can also be multi-channel processors. Each channel can includes all of the components in the pipeline. However, the execution unit for each channel will differ. For example, the execution unit of one channel can be a memory unit. The execution unit for another channel can be an arithmetic unit. Each channel includes its own replay mechanism. For other embodiments, the processor can be a multi-threaded processor. The slow checker can cause some of the threads to be retired while others are being replayed. Thus an execution unit may be more efficiently used by a number of threads.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:

scheduling an instruction for execution;

speculatively executing said instruction;

determining whether said instruction executed correctly;

routing said instruction to a replay mechanism if said instruction did not execute correctly;

determining whether a replay tornado exists;

routing said instruction for re-execution if said instruction executed incorrectly and no replay tornado exists;

breaking said replay tornado if said replay tornado exists, said breaking comprising:

retiring replay safe instructions in said pipeline;

marking non-replay safe instructions in said pipeline for re-execution; and rescheduling said non-replay safe instructions for re-execution;

tracking length of time that has elapsed since a last primary replay cause was detected.

2. The method of claim 1 wherein said determining whether a replay tornado exists further comprises checking if said length of time that has elapsed has exceeded a tornado detection time limit when a secondary replaying instruction is detected.

3. The method of claim 1 wherein an incorrectly executed instruction is not put back into execution until a signal indicates that said incorrectly executed instruction can be executed correctly.

4. The method of claim 3 further comprising placing said incorrectly executed instruction back into execution in a manner that will not start a tornado.

5. The method of claim 4 wherein said placing said incorrectly executed instruction back into execution in a manner that will not start a tornado comprises:

entering instructions that are not replay safe into a scheduler in program order;

setting a result register for each of said instructions entering said scheduler; and scheduling said instructions for execution.

6. A method comprising:
storing an instruction in a queue, said queue to store a plurality of instructions and information related to each of said instructions, said information comprising a set of status bits for each of said instructions;
scheduling said instruction;
speculatively executing said instruction;
checking whether said instruction executed correctly;
flagging said instruction for replay if said instruction did not execute correctly;
determining whether a replay tornado exists and if said instruction is part of said replay tornado;
retiring replay safe instructions;
rescheduling said non-replay safe instructions for re-execution;
toggling status bits in said queue for said non-replay safe instructions to indicate need to reschedule and re-execute said non-replay safe instructions; and tracking amount of time since a last primary replay cause.

7. The method of claim 6 wherein said determining whether said replay tornado exists further comprises comparing said time since said last primary replay cause with a time limit, wherein said replay tornado exists if said time since said last primary replay cause exceeds said time limit when a secondary replaying instruction is detected.

8. The method of claim 7 wherein said determining whether said replay tornado exists further comprises measuring a current rate of replay and determining whether a tornado exists if said current rate of replay exceeds a time limit since said last primary replay cause.

9. A processor comprising:
a scheduler to dispatch instructions, said scheduler comprising a scheduler queue to store said instructions and a status associated to each of said instructions, said scheduler to store each instruction until that instruction is indicated to be replay safe;
an execution unit coupled to said scheduler, said execution unit to execute said instructions;
a checker coupled to said execution unit, said checker to determine whether each instruction has executed correctly; and
a replay mechanism coupled to said checker, said replay mechanism to receive an indication from said checker for each instruction that has not executed correctly, said replay mechanism further comprising logic to determine whether a replay tornado exists and whether said incorrectly executed instruction is part of said replay tornado, said replay mechanism further comprising a tornado stopping mechanism to break said replay tornado, wherein said tornado stopping mechanism comprises logic to retire replay safe instructions in an execution pipeline, and to set statuses for said non-replay safe instructions to indicate a need for rescheduling said non-replay safe instructions and wherein said status associated to each of said instructions comprises a set of bits to indicate if associated instruction is replay safe, is part of a replay tornado, is being replayed, and has been dispatched.

10. The processor of claim 9 wherein said indication from said checker causes said replay mechanism to request said scheduler to reschedule said incorrectly executed instruction for re-execution if no replay tornado is present.

11. The processor of claim 10 further comprising:
a retirement unit coupled to said checker to receive any instructions that have executed correctly, said retirement unit to retire said instructions that have executed correctly;
a first level internal cache coupled to said execution unit; and
a second level internal cache coupled to said execution, wherein access time to said second level internal cache is greater than to said first level cache.

12. The processor of claim 11 wherein said processor is coupled to an external main memory and to a disk memory.

13. The processor of claim 12 wherein said incorrectly executed instruction is a memory load operation, said memory load instruction operation to cause a memory fetch, said memory fetch to search through a memory hierarchy for requested data, wherein said memory hierarchy comprises of said first level cache, said second level cache, said external main memory, and wherein said first level cache has fastest access time and said main memory has longest access time; and wherein each incorrect execution of said memory load instruction causes said memory fetch to access a slower level of memory, and said logic increases said time delay to approximate an access latency to said slower level of memory.

14. A method comprising:
storing an instruction in a queue, said queue to store a plurality of instructions and information related to each of said instructions, said information comprising a set of status bits for each of said instructions;
scheduling said instruction;
speculatively executing said instruction;
checking whether said instruction executed correctly;
flagging said instruction for replay if said instruction did not execute correctly;
determining whether a replay tornado exists and if said instruction is part of said replay tornado;
retiring replay safe instructions;
rescheduling said non-replay safe instructions for re-execution;
toggling status bits in said queue for said non-replay safe instructions to indicate need to reschedule and re-execute said non-replay safe instructions; and
a primary cause instruction is added to a list of replay tornado causing instructions if said replay tornado exists and said primary cause was said last primary replay cause before detection of the tornado.

15. The method of claim 14 wherein said list of replay tornado causing instructions is used to predict instructions that are likely to cause replay tornadoes.

16. The method of claim 15 wherein instructions determined to have not produced a correct result are put back into execution in a manner that will not start tornadoes if said instructions are predicted to be likely to cause replay tornadoes.

17. The method of claim 16 further comprising:
entering said instructions that are not replay safe into a scheduler in program order;
providing results to said instructions entering said scheduler; and
scheduling said instructions for execution.

* * * * *